United States Patent [19]
Holroyd

[11] Patent Number: 5,005,415
[45] Date of Patent: Apr. 9, 1991

[54] METHOD AND APPARATUS FOR DETECTING VARIATIONS IN A PROCESS BY PROCESSING EMITTED ACOUSTIC SIGNALS

[75] Inventor: Trevor J. Holroyd, Derby, England

[73] Assignee: Stresswave Technology Limited, Derby, England

[21] Appl. No.: 417,920

[22] Filed: Oct. 6, 1989

[30] Foreign Application Priority Data

Oct. 22, 1988 [GB] United Kingdom ............... 8824793

[51] Int. Cl.⁵ .......................................... G06F 15/46
[52] U.S. Cl. ....................................... 73/587; 73/602; 73/646; 73/801; 73/577; 73/658
[58] Field of Search ................ 73/587, 602, 646, 647, 73/658, 661, 801

[56] References Cited

U.S. PATENT DOCUMENTS 4,209,779  3/1978  Beck et al. ..................... 340/683
4,609,994  9/1986  Bassim et al. .................. 364/551

FOREIGN PATENT DOCUMENTS 0201206  10/1985  Japan ............................. 73/587

Primary Examiner—Hezron E. Williams
Assistant Examiner—Craig Miller
Attorney, Agent, or Firm—Cushman, Darby & Cushman

[57] ABSTRACT

An apparatus for processing acoustic emissions or stress waves in order to recognize features indicative of variations in the process producing the acoustic emissions. The apparatus comprises a transducer acoustically coupled to a machine or industrial process and arranged to detect the acoustic emissions and produce an electrical signal. The electrical signal is amplified by an amplifier and the mean level of the electrical signal is measured by a mean level detector and the minimum level of the electrical signal is measured by a minimum level detector. A ratio measurer measures the ratio of the mean level of the electrical signal to the minimum level of the electrical signal. This method is self compensating for variations in the operating conditions of the machine or industrial process, is not significantly affected by electromagnetic switching transients, and can cope with very high numbers of transient excursions.

19 Claims, 2 Drawing Sheets

METHOD AND APPARATUS FOR DETECTING VARIATIONS IN A PROCESS BY PROCESSING EMITTED ACOUSTIC SIGNALS

BACKGROUND OF THE INVENTION

1. Field of the Invention

The present invention relates to a method and apparatus for processing electrical signals in order to recognize signal features indicative of variations in a process producing the electrical signals, and is particularly of interest for acoustic emissions or stress waves detected by transducers.

2. Description of Related Art

Acoustic emission or stress wave activity is associated with operating machinery or processes, and is produced as a result of friction or impacts taking place during the operation of the machinery or process.

In prior art methods of processing acoustic emissions a transducer detects the acoustic emissions and produces an electrical signal, which corresponds to the acoustic emission activity. In a first method the level of the electrical signal is measured, for example the mean level (RMS level). A good component operating under normal conditions gives a relatively low electrical signal level, corresponding to a relatively low acoustic emission activity whereas a bad component under normal conditions gives a relatively high electrical signal level, corresponding to a relatively high acoustic emission activity. A good component operating under adverse conditions also gives a relatively high electrical signal level. This method is therefore only suitable for use at a fixed operational condition, or some method of normalizing the electrical signal level measurement with respect to the operating conditions is required. As an example, if the acoustic emission activity from a rotating structure increases with rotational speed, it would be necessary to normalize for different rotational speeds. Furthermore, this type of measurement is sensitive to the detection sensitivity of the transducer during the measurement.

In a second method the ratio of the peak level of the electrical signal to the mean level (RMS level) of the electrical signal is measured. The ratio of the peak level of the electrical signal to the mean of the electrical signal provides a measure of variations in the nature or form of the source processes producing the acoustic emissions enabling the occurrence of distress to be detected due to the increased occurrence of transient signal excursions. This method has the advantage of being self normalizing since to a first approximation it is independent of the operating condition and variations in signal detection sensitivity. A disadvantage of this method is the susceptibility of the measurement to spurious electrical noise signals such as those caused by electromagnetic switching transients, which can give rise to relatively high ratios of peak level of electrical signal to mean level of electrical signal.

A third method measures the amount of electrical signal which exceeds a predetermined threshold level. Ideally the threshold level floats dependent upon the electrical signal level viewed over a longer time period. For example the threshold level may be two times the mean level of the electrical signal. This method also has the advantage of being self normalizing. A disadvantage of this method is that as the number of transient signal excursions per unit time increases there is also a tendency for the floating threshold level to rise.

It is possible for this method to give a reducing value for the amount of signal which exceeds the threshold level as the rate of transient signal excursions increases because the floating threshold level rises significantly over and above that caused by any rise in the continuous level.

SUMMARY OF THE INVENTION

The present invention seeks to provide a method and apparatus for processing electrical signals in order to recognize signal features indicative of variations in the process producing them which overcomes the problems associated with the prior art methods and apparatus.

Accordingly the present invention provides a method of processing electrical signals in order to recognize signal features indicative of variations in the process producing the electrical signals, comprising measuring the minimum value of the electrical signal, measuring the mean value of the electrical signal, determining the ratio of the mean value of the electrical signal to the minimum value of the electrical signal, monitoring said ratio for variations of the ratio which are indicative of variations in the process producing the electrical signal.

The electrical signals may correspond to the acoustic emission activity generated by a process.

The electrical signal may correspond to the intensity of the acoustic activity.

The electrical signal may correspond to the level of the acoustic activity.

The electrical signal may correspond to the level of the acoustic emission activity raised to some power.

The electrical signal may correspond to the square of the level of the acoustic emission activity.

The present invention also provides an apparatus for processing acoustic emissions in order to recognize features indicative of variations in the process producing the acoustic emissions comprising at least one transducer acoustically coupled to a source process producing acoustic emissions and arranged to detect the acoustic emissions and to produce an electrical signal dependent upon the acoustic emission activity, means to measure the minimum value of the electrical signal, means to measure the mean value of the electrical signal and means to determine the ratio of the mean value of the electrical signal to the minimum value of the electrical signal, variations in said ratio are indicative of variations in the process producing the acoustic emissions.

Divider means may measure the ratio of the mean value of the electrical signal to the minimum value of the electrical signal.

A first logarithmic amplifier means may produce the log of the mean value of the electrical signal, a second logarithmic amplifier means may produce the log of the minimum value of the electrical signal, subtractor means subtracts the log of the minimum value of the electrical signal from the log of the mean value of the electrical signal to determine the ratio of the means value of the electrical signal to the minimum value of the electrical signal.

Logarithmic amplifier means may produce the log of the electrical signal, the means to measure the minimum value of the electrical signal measures the minimum value of the log of the electrical signal, the means to measure the mean value of the electrical signal measures the mean value of the log of the electrical signal, subtractor means subtracts the minimum value of the log of the electrical signal from the mean value of the log of the electrical signal to determine the ratio of the mean value of the log of the electrical signal to the minimum value of the log of the electrical signal.

The electrical signal may correspond to the intensity of the acoustic emission activity.

The electrical signal may correspond to the level of the acoustic emission activity.

The electrical signal may correspond to the level of the acoustic emission activity raised to some power.

The electrical signal may correspond to the square of the level of the acoustic emission activity.

BRIEF DESCRIPTION OF THE DRAWINGS

The present invention will be more fully described by way of example with reference to the accompanying drawings, in which.

DETAILED DESCRIPTION OF THE PREFERRED EMBODIMENT

Figure 1:
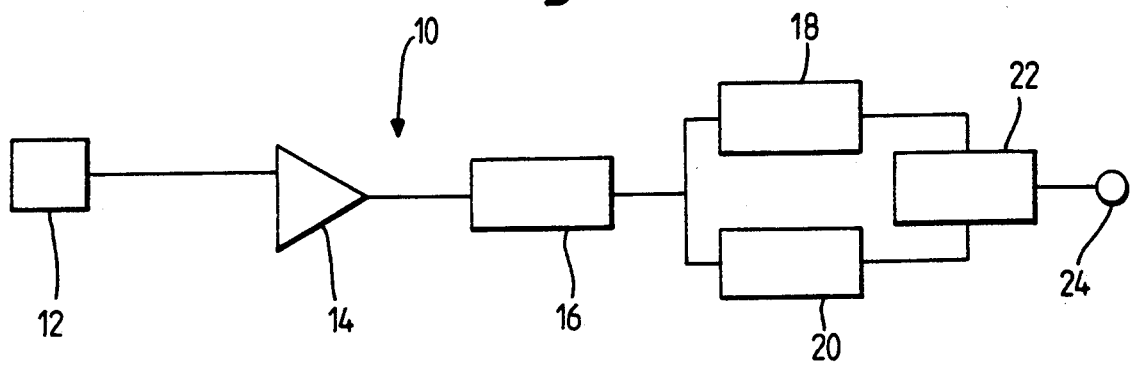
FIG. 1 is an apparatus for processing acoustic emissions according to the present invention.

An apparatus 10 for processing acoustic emissions features indicative of variations in the process producing the acoustic emissions is shown in FIG. 1. The apparatus 10 comprises a transducer 12 which is acoustically coupled to a source process of acoustic emissions. The transducer 12 is coupled to a machine, an industrial process or other structure in which acoustic emissions, stress waves or vibrations are generated as a result of the operation of the machine, industrial process or other reasons in the structure. The acoustic emissions are commonly generated as a result of frictional processes and impacts. The transducer 12 is arranged to detect the acoustic emissions generated by or in the machine, industrial process or structure and to produce an electrical signal dependent upon the acoustic emission activity detected. The transducer 12 is commonly a piezoceramic element although other suitable types of transducer may be used. More than one transducer may be used.

The electrical signal produced by the transducer 12 is supplied to an amplifier 14. The amplifier 14 amplifies the electrical signal and may incorporate filters to select the required frequency band or frequency bands. The amplified electrical signal is then supplied to a signal enveloper 16 which envelopes the electrical signal.

The enveloped electrical signal is supplied to a mean level detector 18 and to a minimum level detector 20. The mean level detector 18 measures the mean, or average, level of the electrical signal corresponding to the mean level of the acoustic emission activity by integrating the electrical signal level over the measuring time period. The minimum level detector 20 measures the minimum level of the electrical signal corresponding to the minimum level of the acoustic emission activity.

The mean level of the electrical signal as detected by the mean level detector 18, and the minimum level of the electrical signal as detected by the minimum level detector 20 are supplied to a ratio measurer 22. The ratio measurer 22 determines the ratio of the mean level of the electrical signal to the minimum level of the electrical signal, which corresponds to the ratio of the mean level of the acoustic emission activity to the minimum level of the acoustic emission activity. The ratio measurer 22 divides the mean level of the electrical signal by the minimum level of the electrical signal and supplies the output to an output terminal 24.

The output terminal 24 may be connected to a display to show the ratio, or may be connected to an alarm such that when the ratio reaches a predetermined value the alarm is operated, or may be connected to a control device such that a feedback signal controls the operation of the machine or process e.g. to reduce the speed of the rotating structure or to add lubricant.

Figure 2:
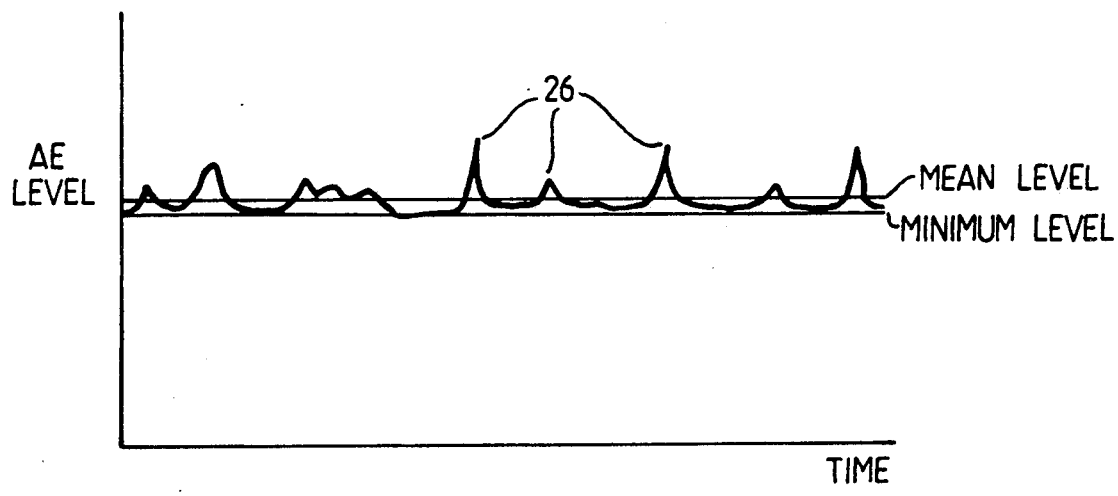
FIG. 2 is a graph of acoustic emission level versus time for a low amount of distress.
Figure 3:
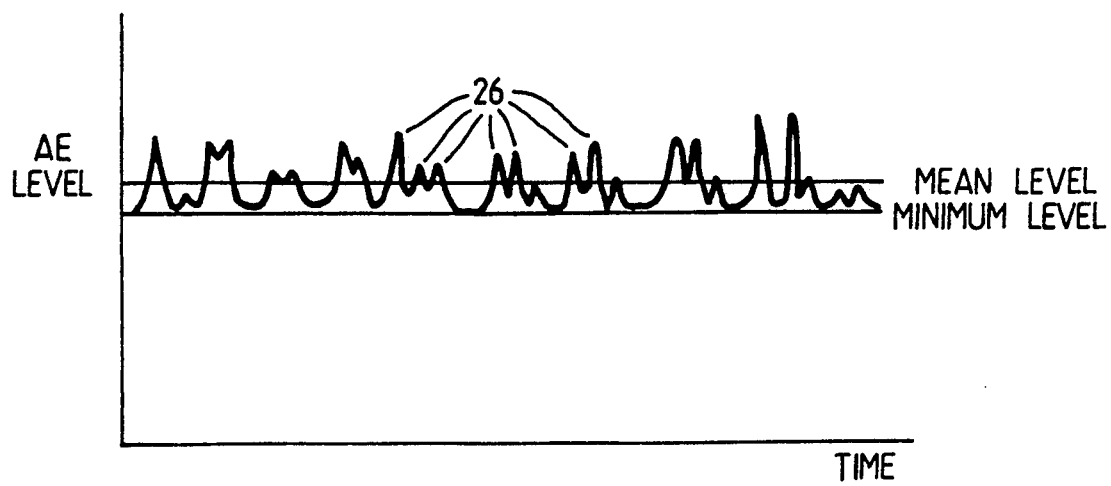
FIG. 3 is a graph of acoustic emission level versus time for a high amount of distress.

FIGS. 2 and 3 show graphs of acoustic emission or stress wave activity level versus time for low amounts of distress and high amounts of distress respectively. The mean level of the acoustic emission activity and the minimum level of the acoustic emission activity are shown in both cases. In FIG. 2 there are relatively few transient excursions 26 per unit time whereas in FIG. 3 there are a relatively high number of transient excursions per unit time. The minimum level of the acoustic emission activity and corresponding electrical signal level remains the same in both figures, but the mean level of the acoustic emission activity and corresponding electrical signal level increases with the number of transient excursions per unit time.

Figure 4:
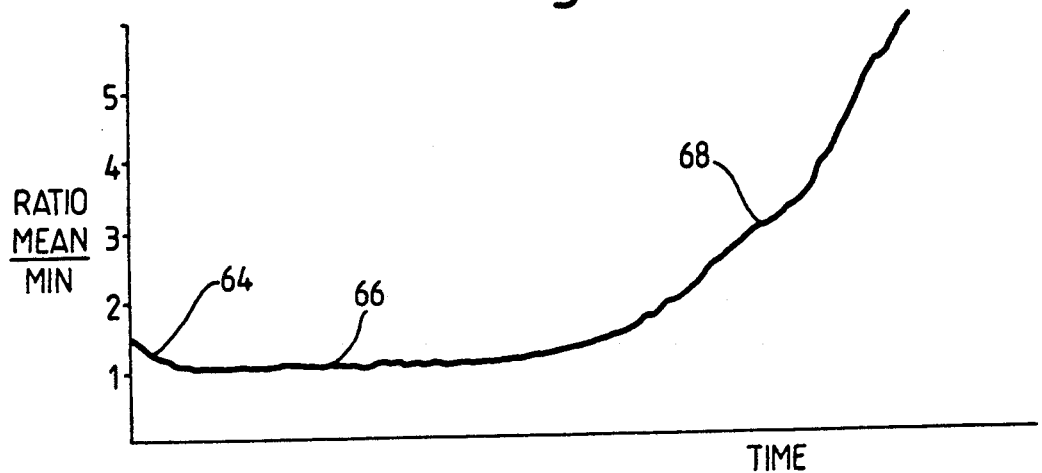
FIG. 4 is a graph of the ratio of the mean level of acoustic emission activity to the minimum level of acoustic emission activity versus time.

The envelope of the electrical signal and corresponding acoustic emission activity is characterized in terms of the ratio of the mean level of the electrical signal to the minimum level of the electrical signal to give a graph as shown in FIG. 4. A smooth envelope electrical signal, i.e. an electrical signal with relatively few and relatively small transient excursions, gives a ratio close to one whereas a rough envelope electrical signal, i.e. an electrical signal with a relatively high number and relatively large transient excursions, gives a ratio much greater than one, dependent upon the number of excursions and the level of the excursions. The area 64 of the graph corresponds to initial bedding in of the rotational structure, area 66 corresponds to normal operation and area 68 corresponds to increasing distress.

This method has the advantages of the second and third prior art methods of being self compensating for variations in the overall level of the electrical signal such as those caused by variation in the operating conditions of the machine or industrial process, i.e. speed, or changes in transducer sensitivity.

This method has the advantage of not being significantly affected by electromagnetic switching transients since these do not affect the minimum level of the electrical signal, and only marginally affect the mean level of the electrical signal as it is an integration of the electrical signal level over the measurement period.

This method also has the advantage of being able to cope with very high numbers of transient excursions per unit time whilst still giving the desired characterization.

This method is also extremely simple to implement compared to the prior art methods.

Figure 5:
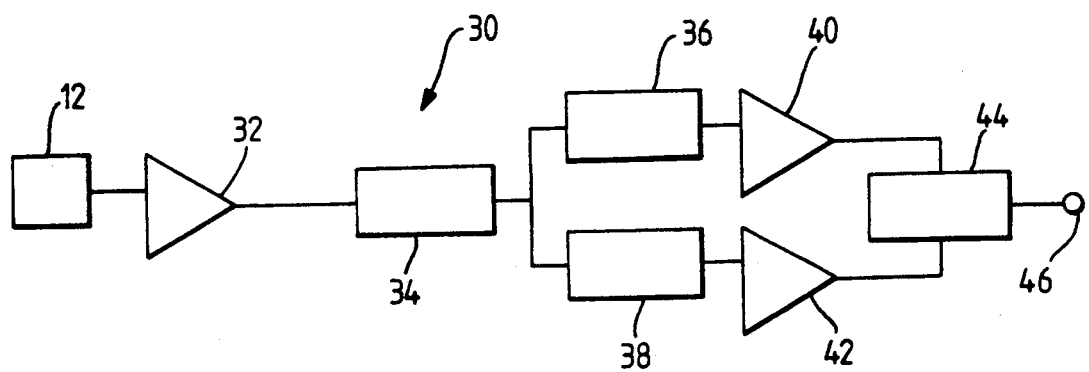
FIG. 5 is a second embodiment of an apparatus for processing acoustic emissions according to the present invention.

A further apparatus 30 for processing acoustic emissions is shown in FIG. 5, which also comprises a transducer 12 acoustically coupled to a source process and arranged to detect the acoustic emissions generated by the source process and to produce an electrical signal dependent upon the acoustic emission activity detected.

The electrical signal is supplied to an amplifier 32 which amplifies the signal. The amplifier 32 may also contain filters as in FIG. 1. The amplified electrical signal is supplied to a signal enveloper 34 which envelopes the electrical signal.

The enveloped electrical signal is supplied to a mean level detector 36 and to a minimum level detector 38. The mean level detector 36 measures the mean, or average, level of the electrical signal corresponding to the mean level of the acoustic emission activity by integrating the electrical signal over the measuring time period. The minimum level detector 38 measures the minimum level of the electrical signal corresponding to the minimum level of the acoustic emission activity.

The mean level of the electrical signal as detected by the mean level detector 36 and the minimum level of the electrical signal as detected by the minimum level detector 38 are supplied to logarithmic amplifiers 40 and 42 respectively. The logarithmic amplifier 40 produces an output signal which is the log of the mean level of the electrical signal, and the logarithmic amplifier 42 produces an output signal which is the log of the minimum level of the electrical signal. The output signals of the logarithmic amplifiers 40 and 42 are supplied to a ratio measurer 44 which measures the ratio of the mean level of the electrical signal to the minimum level of the electrical signal by subtracting the log of the minimum level of the electrical signal from the log of the mean level of the electrical signal and supplying the result to an output 46.

Figure 6:
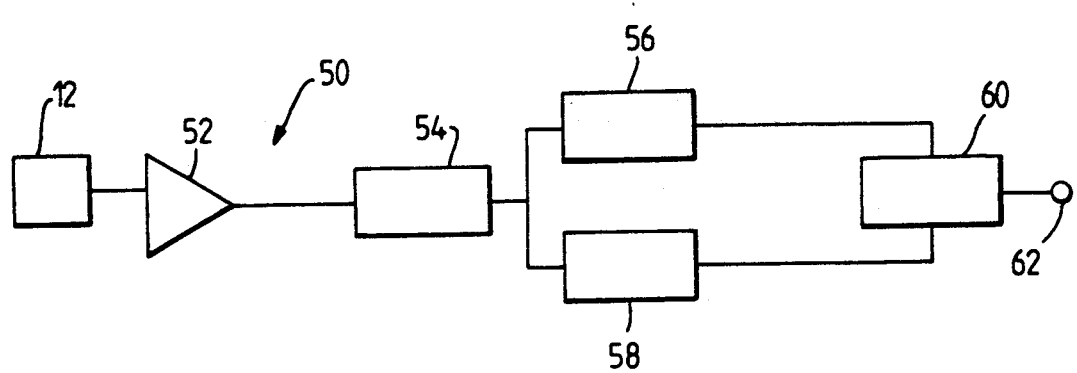
FIG. 6 is a third embodiment of an apparatus for processing acoustic emissions according to the present invention.

Another apparatus 50 for processing acoustic emissions is shown in FIG. 6, this also comprises a transducer 12 acoustically coupled to a source process and arranged to detect the acoustic emissions generated by the source process and to produce an electrical signal dependent upon the acoustic emission activity detected.

The electrical signal is supplied to a logarithmic amplifier 52 which amplifies the signal and produces a log of the electrical signal. The logarithmic amplifier 52 may also contain filters for the same purpose as those in FIG. 1. The logarithmic electrical signal is supplied to a signal enveloper 54. The enveloped logarithmic electrical signal is supplied to a mean level detector 56 and to a minimum level detector 58 to measure the mean level of the enveloped logarithmic electrical signal and the minimum level of the enveloped logarithmic electrical signal. The mean level of the logarithmic electrical signal and the minimum level of the logarithmic electrical signal are supplied to a ratio measurer 60 which measures the ratio of the mean electrical signal level to the minimum electrical signal level. The ratio measurer 60 comprises a subtractor amplifier which subtracts the minimum level of the logarithmic electrical signal from the mean level of the logarithmic electrical signal to give the log of the ratio and supplies the result to an output 62.

Although this method produces a mathematically different result to when the log of the minimum value is subtracted from the log of the mean value, nevertheless it is a viable method of detecting the signal trends.

Although the description has referred to the level of the acoustic emission activity and the level of the electrical signal, the invention is intended to cover the concept of measuring the ratio of the mean electrical signal to the minimum electrical signal whether the electrical signal corresponds to an acoustic emission level, acoustic emission intensity, the acoustic emission level squared or some other power of the acoustic emission level or acoustic emission intensity i.e. (Mean Acoustic Emission level$^2$ ÷ (Minimum Acoustic Emission level)$^2$.

The characterization of the electrical signal may be carried out either linearly or logarithmically.

The description has referred to a method of processing electrical signals, corresponding to acoustic emission activity, in order to recognize features indicative of variations in the process producing the acoustic emissions. The method of processing electrical signals is equally applicable to electrical signals corresponding to other phenomena or parameters.

It is also possible to measure the ratio of the mean electrical signal to the minimum electrical signal by software or computational methods.

What is claimed is:

1. A method of processing electrical signals derived from an acoustic emission activity in order to recognize signal features indicative of variations in a process producing the electrical signals, comprising measuring the minimum value of the electrical signals, measuring the mean value of the electrical signals, determining the ratio of the mean value of the electrical signals to the minimum value of the electrical signals, monitoring said ratio for variations of the ratio which are indicative of variations in the process producing the electrical signals.

2. A method of processing electrical signals as claimed in claim 1 in which the electrical signals correspond to the intensity of the acoustic emission activity.

3. A method of processing electrical signals as claimed in claim 1 in which the electrical signals correspond to the level of the acoustic emission activity.

4. A method of processing electrical signals as claimed in claim 1 in which the electrical signals correspond to the level of the acoustic emission activity raised to a power.

5. A method of processing electrical signals as claimed in claim 1 in which the electrical signals correspond to the square of the level of the acoustic emission activity.

6. A method of processing electrical signals as claimed in claim 1 in which said ratio of the mean value of the electrical signals to the minimum value of the electrical signals is determined by dividing the mean value of the electrical signals by the minimum value of the electrical signals.

7. A method of processing electrical signals as claimed in claim 1 in which said ratio of the mean value of the electrical signals to the minimum value of the electrical signals is determined by dividing the minimum value of the electrical signals by the mean value of the electrical signals.

8. An apparatus for processing acoustic emissions in order to recognize features indicative of variations in a process producing the acoustic emissions comprising at least one transducer acoustically coupled to the process producing acoustic emissions, the at least one transducer being arranged to detect the acoustic emissions and to produce an electrical signal dependent upon the acoustic emission activity, means to measure the minimum value of the electrical signal being electrically connected to the transducer, means to measure the mean value of the electrical signal being electrically connected to the transducer, means to determine the ratio of the mean value of the electrical signal to the minimum value of the electrical signal being electrically connected to the means to measure the mean value of the electrical signal and to the means to measure the minimum value of the electrical signal, variations in said ratio being indicative of variations in the process producing the acoustic emissions.

9. An apparatus as claimed in claim 8 in which divider means determine the ratio of the mean value of the electrical signal to the minimum value of the electrical signal.

10. An apparatus as claimed in claim 8 in which a first logarithmic amplifier means produces the log of the mean value of the electrical signal, a second logarithmic amplifier means produces the log of the minimum value of the electrical signal, subtractor means subtracts the log of the minimum, value of the electrical signal from the log of the mean value of the electrical signal to determine the ratio of the mean value of the electrical signal to the minimum value of the electrical signal.

11. An apparatus as claimed in claim 8 in which logarithmic amplifier means produces the log of the electrical signal, the means to measure the minimum value of the electrical signal measures the minimum value of the log of the electrical signal, the means to measure the mean value of the log of the electrical signal measures the mean value of the log of the electrical signal, subtractor means subtracts the minimum value of the log of the electrical signal from the mean value of the log of the electrical signal to determine the ratio of the mean value of the log of the electrical signal to the minimum value of the log of the electrical signal.

12. An apparatus as claimed in claim 8 in which the electrical signal corresponds to the intensity of the acoustic emission activity.

13. An apparatus as claimed in claim 8 in which the electrical signal corresponds to the level of the acoustic emission activity.

14. An apparatus as claimed in claim 8 in which the electrical signal corresponds the level of the acoustic emission activity raised to a power.

15. An apparatus as claimed in claim 14 in which the electrical signal corresponds to the square of the level of the acoustic emission activity.

16. An apparatus as claimed in claim 8 in which the means to determine the ratio operates an alarm when the ratio is equal to or greater than a predetermined value.

17. An apparatus as claimed in claim 8 in which the means to determine the ratio sends a signal to a control device, the control device being arranged to send a feedback signal to control the operation of said process.

18. An apparatus as claimed in claim 8 in which said ratio of the mean value of the electrical signal to the minimum value of the electrical signal is determined by dividing the minimum value of the electrical signal by the mean value of the electrical signal.

19. An apparatus as claimed in claim 8 in which said ratio of the mean value of the electrical signal to the minimum value of the electrical signal is determined by dividing the mean value of the electrical signal by the minimum value of the electrical signal.

* * * * *

UNITED STATES PATENT AND TRADEMARK OFFICE
CERTIFICATE OF CORRECTION

PATENT NO. : 5,005,415
DATED      : April 9, 1991
INVENTOR(S) : HOLROYD, Trevor J.

It is certified that error appears in the above-identified patent and that said Letters Patent is hereby corrected as shown below:

Column 6, line 8, after "level" insert a closed parenthesis -- ) --. and delete the period after "÷".

Column 7, line 20, after "minimum" delete the comma ",".

Signed and Sealed this

Fifteenth Day of September, 1992

Attest:

DOUGLAS B. COMER

*Attesting Officer*     *Acting Commissioner of Patents and Trademarks*